United States Patent
Yasui

(10) Patent No.: US 9,244,670 B2
(45) Date of Patent: Jan. 26, 2016

(54) DRIVER MANAGING PROGRAM AND INFORMATION PROCESSING

(71) Applicant: Ryo Yasui, Nagoya (JP)

(72) Inventor: Ryo Yasui, Nagoya (JP)

(73) Assignee: BROTHER KOGYO KABUSHIKI KAIHSA, Nagoya-Shi, Aichi-Ken (JP)

( * ) Notice: Subject to any disclaimer, the term of this patent is extended or adjusted under 35 U.S.C. 154(b) by 31 days.

(21) Appl. No.: 13/828,818

(22) Filed: Mar. 14, 2013

(65) Prior Publication Data

US 2014/0007077 A1  Jan. 2, 2014

(30) Foreign Application Priority Data

Jun. 27, 2012 (JP) ................................. 2012-144405

(51) Int. Cl.
*G06F 9/445* (2006.01)
*G06F 9/44* (2006.01)

(52) U.S. Cl.
CPC ................ *G06F 8/61* (2013.01); *G06F 9/4411* (2013.01)

(58) Field of Classification Search
CPC .............................. G06F 17/211; G06F 3/1205
USPC .................................................. 717/122, 174
See application file for complete search history.

(56) References Cited

U.S. PATENT DOCUMENTS

| | | | | |
|---|---|---|---|---|
| 7,395,533 B2 * | 7/2008 | Suzuki | ........................... | 717/174 |
| 8,587,824 B2 * | 11/2013 | Furuya | ............................. | 358/1.3 |
| 8,736,860 B2 * | 5/2014 | Meike et al. | ................. | 358/1.13 |
| 2004/0167973 A1 | 8/2004 | Shima et al. | | |
| 2004/0187105 A1 * | 9/2004 | Inada | ............................ | 717/174 |
| 2009/0150880 A1 * | 6/2009 | Park et al. | ...................... | 717/174 |
| 2009/0268234 A1 * | 10/2009 | Furuya | ........................... | 358/1.15 |
| 2010/0042987 A1 * | 2/2010 | Yamada | ........................ | 717/174 |
| 2010/0318984 A1 * | 12/2010 | Araki | ............................. | 717/174 |
| 2011/0302575 A1 * | 12/2011 | Hasama | ........................ | 717/174 |
| 2012/0030584 A1 * | 2/2012 | Bian | ............................... | 715/746 |
| 2012/0278796 A1 * | 11/2012 | Sandlin et al. | ................. | 717/174 |

FOREIGN PATENT DOCUMENTS

| | | |
|---|---|---|
| JP | 2004-038686 A | 2/2004 |
| JP | 2007-249673 A | 9/2007 |

OTHER PUBLICATIONS

Windows, Developing Metro Style Device Apps for Printers, May 31, 2012.*

* cited by examiner

*Primary Examiner* — Isaac T Tecklu
*Assistant Examiner* — Reshaun M Finkley
(74) *Attorney, Agent, or Firm* — Scully, Scott, Murphy & Presser, P.C.

(57) ABSTRACT

A non-transitory computer-readable medium storing instructions to control a information processing device, wherein the operating system outputs process data to a device driver program, in which, when the device driver program is a first-type device driver program interpreting a first-format process data, the first-format process data is output, and when the device driver program is a second-type device driver program interpreting a second-format process data, the first-format process data is converted into the second-format process data to output, the instructions, when executed by a processor, cause the information processing device to perform: inquiring of the operating system about the device driver; receiving a inquiry result from the operating system; judging whether the device driver program is the second-type device driver program based on the inquiry result; and performing, when it is judged that it is the second-type device driver program, a process for installing the first-type device driver program.

9 Claims, 10 Drawing Sheets

DRIVER MANAGING PROGRAM AND INFORMATION PROCESSING

CROSS-REFERENCE TO RELATED APPLICATION

This application claims priority from Japanese Patent Application No. 2012-144405 filed on Jun. 27, 2012, the entire subject matter of which is incorporated herein by reference

TECHNICAL FIELD

This disclosure relates to a technique for managing a device driver program.

BACKGROUND

A device driver program for controlling devices such as a printer or a facsimile (referred to as FAX) may be provided for each type of operating systems (referred to as OS).

In the case where the device driver program is provided for each type of OS, there is a device which, when a request is received from a client PC, distinguishes the OS used for the client PC and notifies, as a response, a location address of the device driver program corresponding to the distinguished OS to the client PC.

SUMMARY

There is the OS, in which a first-type device driver program interpreting a first-format process data to control the device and a second-type device driver program interpreting a second-format process data to control the device is to be installed.

In such an OS, when the device driver program being an output destination of the process data is the first-type device driver program, the first-format process data is output to the device driver program. On the other hand, when the device driver program being an output destination of the process data is the second-type device driver program, the first-format process data is converted into the second-format process data, and it is output to the device driver program.

However, when the format of the process data is converted, the process data may be deteriorated in the converting process, and thus the process quality by the device may be deteriorated.

This disclosure provides at least a technique for suppressing the deterioration of process quality due to using of the device driver program required for the conversion of the process data.

A non-transitory computer-readable medium of this disclosure stores instructions to control a information processing device, in which an operating system is executed, wherein the operating system outputs process data to a device driver program, in which, when the device driver program being an output destination of the process data is a first-type device driver program interpreting a first-format process data, the first-format process data is output, and in which, when the device driver program being an output destination of the process data is a second-type device driver program interpreting a second-format process data different from the first-format process data, the first-format process data is converted into the second-format process data to output the second-format process data. The instructions, when executed by a processor, cause the information processing device to perform: inquiring of the operating system about the device driver installed in the information processing device; receiving a inquiry result from the operating system; judging whether the device driver program installed in the information processing device is the second-type device driver program based on the inquiry result; and performing, when it is judged that the device driver program is the second-type device driver program, a process for installing the first-type device driver program.

This disclosure will be applied to various aspects, such as an information process device, an information processing system, a driver control method, and a driver control program.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Illustrative Embodiment 1

Figure 1:
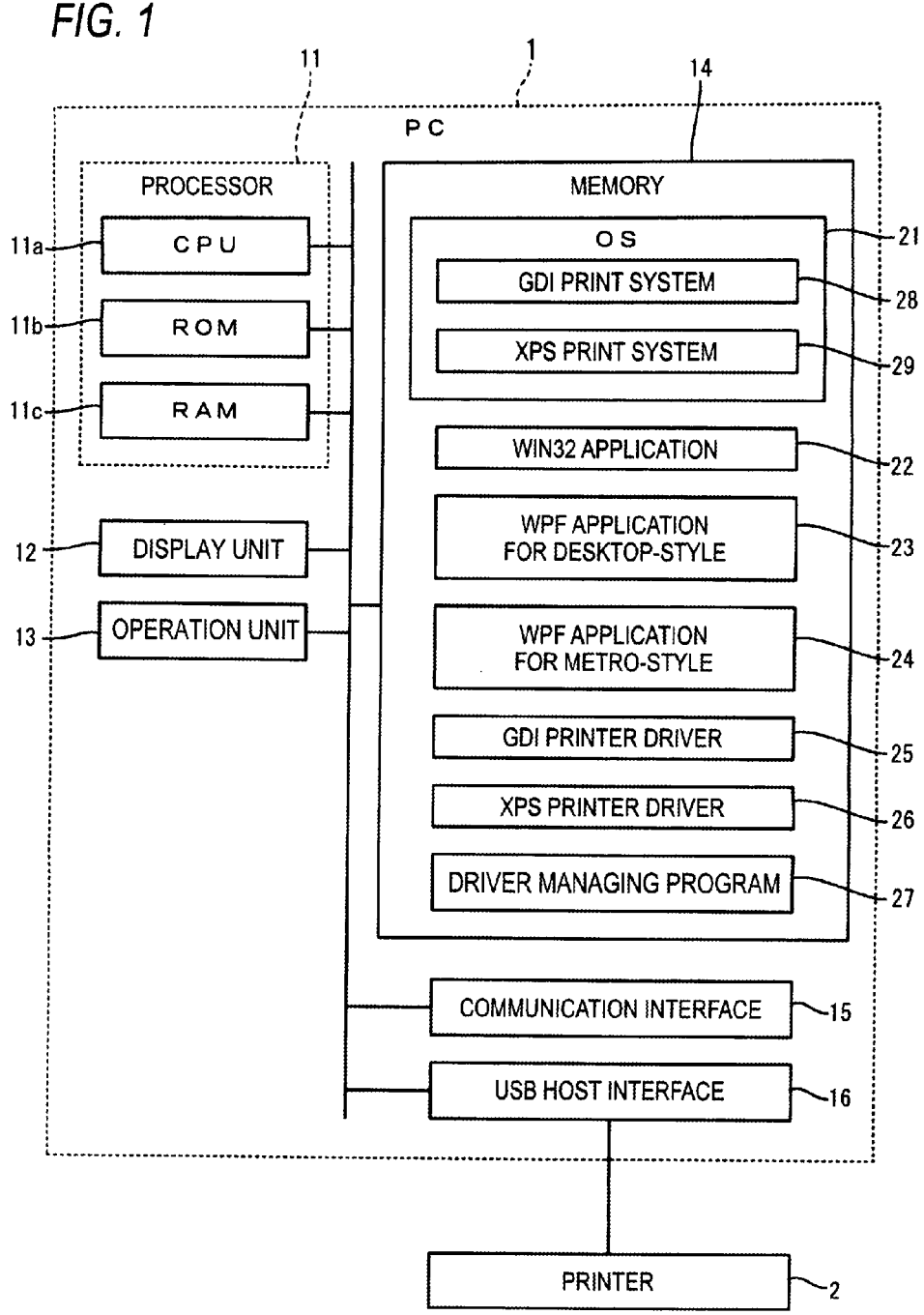
FIG. 1 is a block diagram schematically illustrating the electrical configuration of an information processing device according to the first illustrative embodiment.

The first illustrative embodiment will be described with reference to FIGS. 1 to 6.

(1) Configuration of Information Processing Device

First, an electrical configuration of an information processing device 1 (referred to as PC) will be described with reference to FIG. 1. The PC 1 is a so-called tablet-shaped computer, and is generally operated using a touch panel.

The PC 1 includes a processor 11, a display unit 12, an operation unit 13, a memory 14, a communication interface 15, and a USB host interface 16.

The processor 11 includes a CPU 11a, a ROM 11b, and a RAM 11c. The CPU 11a controls all units of the PC 1 by executing a program stored in the ROM 11b or the memory 14. A program or data executed by the CPU 11a stored in the ROM 11b. The RAM 11c is used as a main memory for the CPU 11a to execute various processing.

The display unit 12 includes a display such as a liquid crystal display, and a display driving circuit for driving the display.

The operation unit 13 includes a substantially transparent touch panel covering a display surface of the display device, and a control circuit for controlling the touch panel. Further, the operation unit 13 may include an interface to which an input device, such as a keyboard or a mouse, is connected.

The memory 14 is a device for memorizing various programs and data using a hard disc or a nonvolatile memory such as a flash memory.

The memory 14 memories an OS 21, a Win32 application 22, a WPF (Windows (registered trademark) Presentation Foundation) application 23 for a Desktop-style, a WPF application 24 for a Metro-style, a GDI printer driver 25, an XPS printer driver 26, and a driver managing program 27.

Hereinafter, Windows® 8 of Microsoft Corporation will be described as the OS 21. However, the OS 21 is not limited to Windows® 8.

The WPF applications 23 and 24 are an application requiring for a library called as ".Net Framework" for execution thereof. The Win32 application 22 is a native application which does not require for that library.

The communication interface 15 is configured to connect the PC 1 and peripheral devices, such as a printer or a server, to communicate them via a communication network such as an LAN (Local Area Network) or Internet. The communication interface 15 may be connected to the communication network via a cable, or may be wirelessly connected thereto.

The USB (Universal step Serial Bus) host interface 16 includes a USB host controller or a connection port. The USB device interface 16 is connected to a USB device such as a printer 2.

That is, the PC 1 may control the printer 2 to carry out the printing via a communication network, and may control the printer 2 connected to the USB host interface 16 to carry out the printing.

(2) Operation Style

Figure 2:
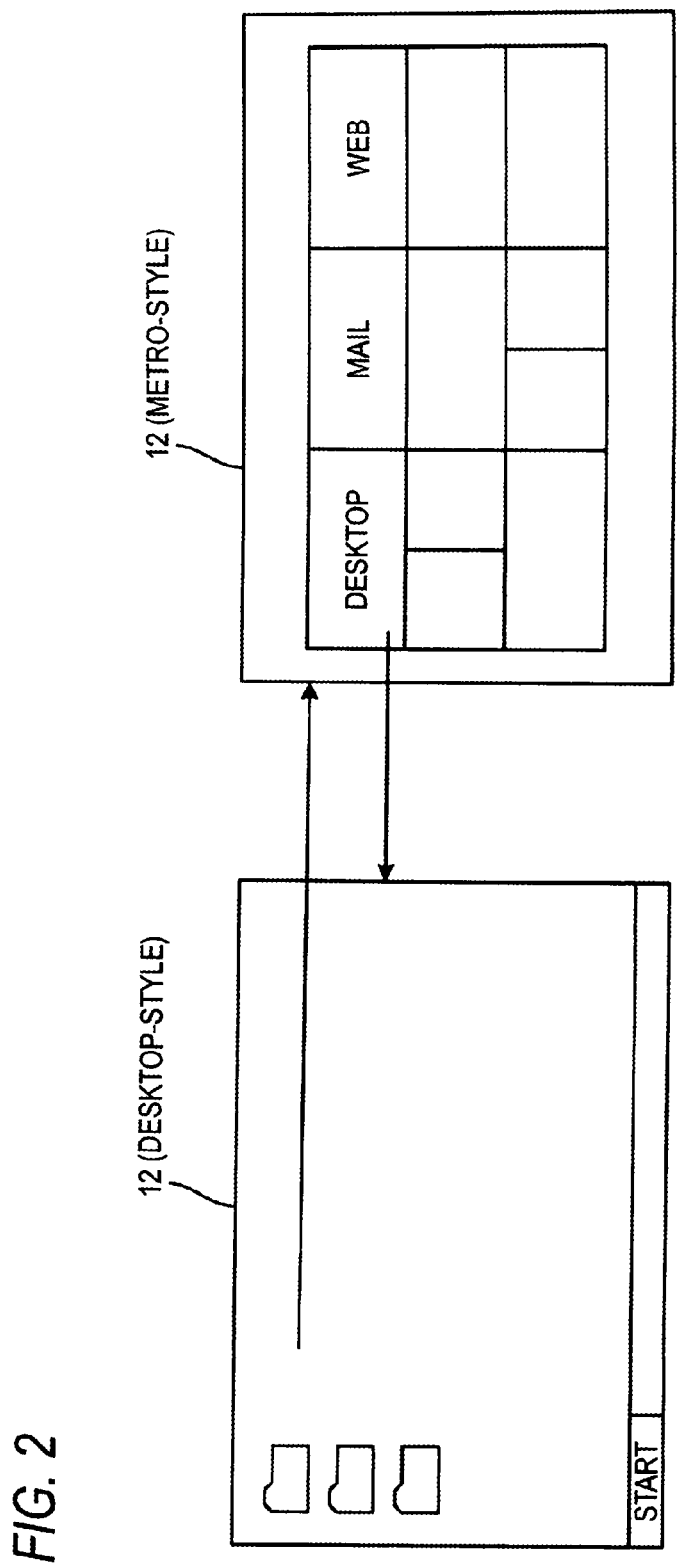
FIG. 2 is a diagram illustrating a Desktop-style and a Metro-style.

Next, the operation style of Windows® 8 will be described with reference to FIG. 2. In the following description, the operation style will be described with just a style.

In Windows® 8, a style referred to as a Desktop-style and a style referred to as a Metro-style can be switched. In other words, the style is a program execution environment which is a base for executing the application.

The Metro-style is a newly developed style, and is a style developed assuming that it is generally operated using the touch panel. In the Metro-style, the WPF application works, but the Win32 application does not work. The Metro-style is one example of the first operation style.

The Desktop-style is a well-known style, and is a style developed assuming that it is generally operated using a mouse or a keyboard. In the Desktop-style, both the WPF application and the Win32 application work. The Desktop-style is one example of the second operation style.

However, the Metro-style and the Desktop-style are incompatible even in the WPF application. Therefore, for example, the WPF application 24 for the Metro-style does not work in the Desktop-style, and the WPF application 23 for the Desktop-style does not work in the Metro-style.

When switching into the Desktop-style, the WPF application 24 for the Metro-style is stopped, and then when it is switched in the Metro-style, the WPF application 24 restarts.

More specifically, when a user operates to switch it into the Desktop-style, the WPF application 24 for the Metro-style executes a withdrawal process to store information for returning the current state when it is in a subsequent Metro-style, in the RAM 11c (otherwise, the memory 14) before the operation is stopped.

Then, when the Desktop-style is switched in the Metro-style, the WPF application 24 for the Metro-style reads the stored information of the withdrawal process, and then executes a return process to return to the previous state.

On the other hand, the WPF application 23 for the Desktop-style continuously works in a background while it is being in the Metro-style.

(3) Flow of Printing in Each Style

Next, the flow of the printing in each style will be described.

(3-1) Flow of Printing in Desktop-Style

Figure 3:
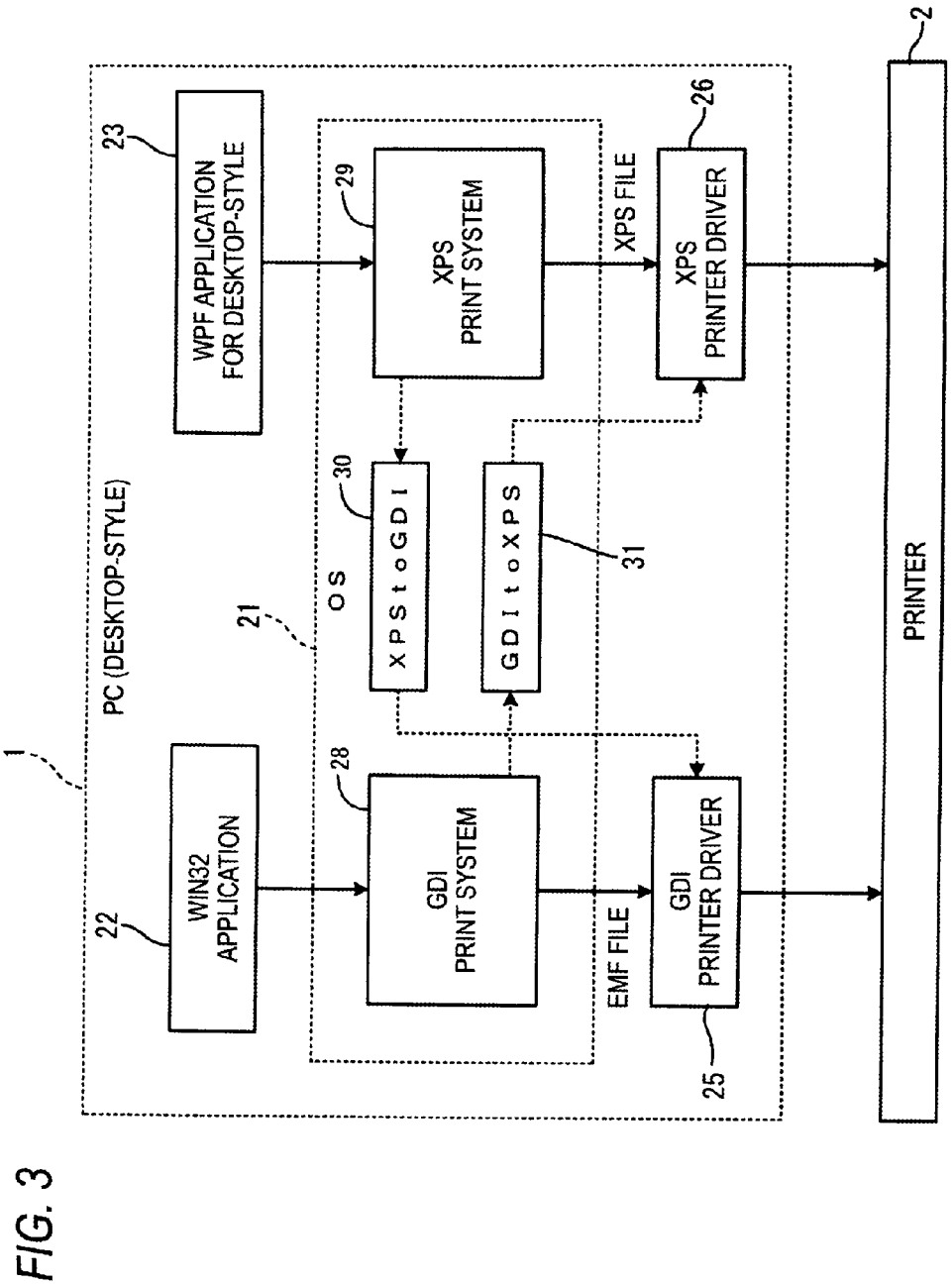
FIG. 3 is a diagram illustrating the flow of printing in the Desktop-style.

First, the flow of the printing in the Desktop-style will be described with reference to FIG. 3.

The WPF application 23 for the Desktop-style outputs a print command to an XPS print system 29 through an API (Application Programming Interface) provided by the XPS print system 29. The print command output to the XPS print system 29 is one example of the first-type data process command The XPS print system 29 is a print subsystem provided as a part of the OS 21. When the XPS print system 29 receives the print command from the WPF application 23, the XPS print system generates a spool file (referred to as an XPS file) of an XPS (XML Paper step Specification) format based on the received print command. The XPS print system 29 outputs the generated XPS file to the XPS printer driver 26 corresponding to the printer designated by the WPF application 23. The XPS file is one example of the first-format process data. Additionally, the WPF application 23 may generate the XPS file and output it to the XPS print system 29.

The XPS printer driver 26 is a device driver program capable of interpreting the XPS file and converting it into a control command of the printer to control the printer to carry out the printing. The XPS printer driver 26 is one example of a first-type device driver program.

The Win32 application 22 outputs a print command to the GDI print system 28 via an API referred to as a GDI (Graphics Device Interface) provided by the GDI print system 28. The print command output to the GDI print system 28 is one example of a second-type data process command.

The GDI print system 28 is also a print subsystem provided as a part of the OS 21. When the GDI print system 28 receives a print command from the Win32 application 22, the GDI print system generates a spool file (referred to as an EMF file) of EMF (Enhanced Metafile Format) based on the print command received. The GDI print system 28 outputs the generated EMF file to the GDI printer driver 25 corresponding to the printer designated by the Win32 application 22. The EMF file is one example of a second-format process data.

The GDI printer driver 25 is a device driver program capable of interpreting the EMF file and converting it into a control command of the printer to control the printer to carry out the printing. The GDI printer driver 25 is one example of a second-type device driver program.

As described above, the WPF application 23 and the Win32 application 22 are executed in the Desktop-style. However, only one printer driver is usually used for one printer. Therefore, the printer driver corresponding to the printer executing the printing may be the GDI printer driver 25, while the application is the WPF application 23.

In this case, the OS 21 converts the XPS file into the EMF file to output it to the GDI printer driver 25 by executing an XPS-to-GDI process 30. On the other hand, the reverse case is similar, that is, the OS 21 converts the EMF file into the XPS file to output it to the XPS printer driver 26 by executing a GDI-to-XPS processing 31.

However, when the XPS is converted into the EMF file, or the EMF file is converted into the XPS file, the print data may be deteriorated in the process, and thus the print quality with the printer is decreased.

(3-2) Flow of Printing in Metro-Style

Figure 4:
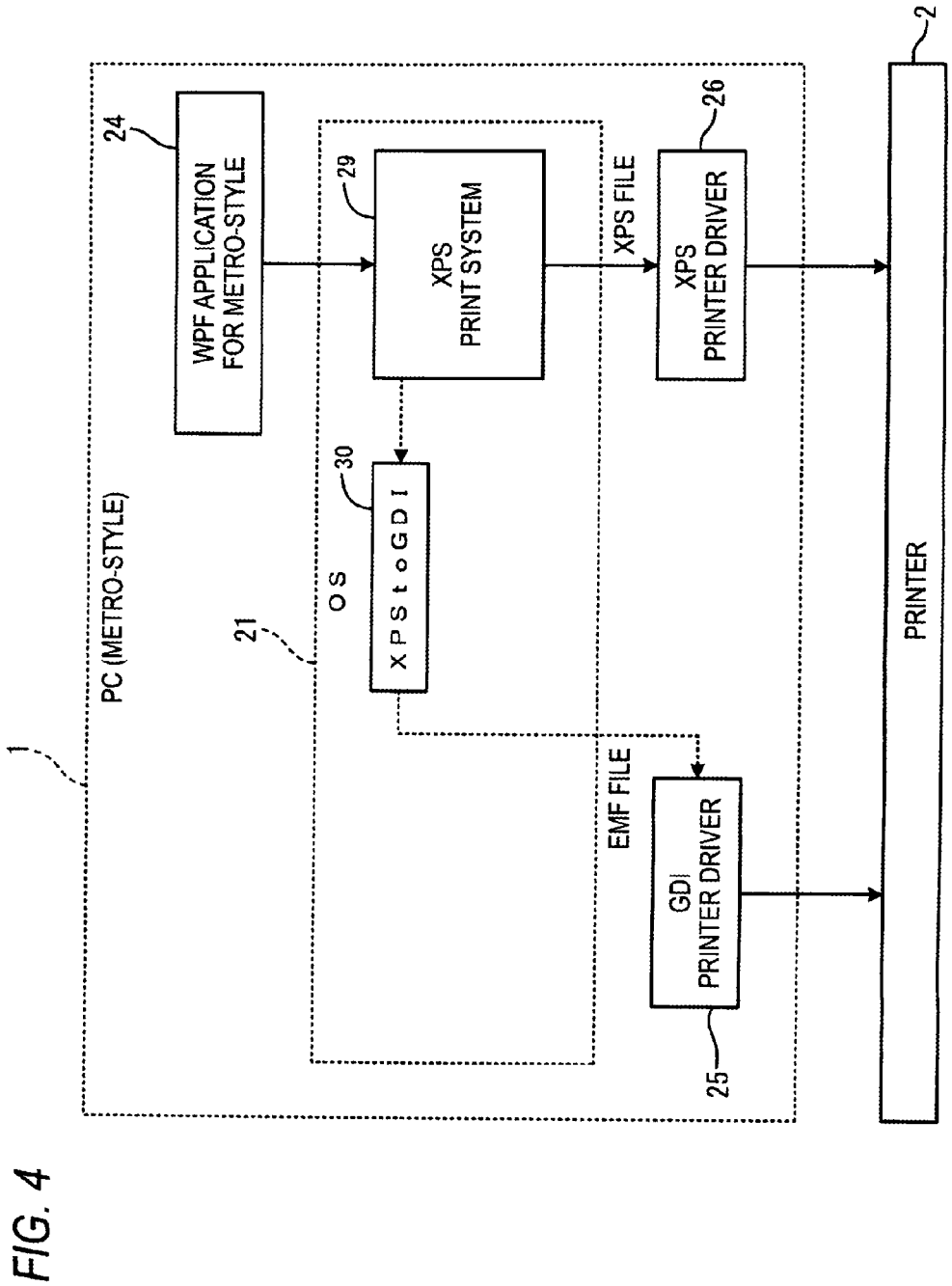
FIG. 4 is a diagram illustrating the flow of printing in the Metro-style.

Hereinafter, the flow of the printing in the Metro-style will now be described with reference to FIG. 4.

The WPF application 24 for the Metro-style outputs the print command to the XPS print system 29 via the API provided by the XPS print system 29. Since the following flow is equal to that in FIG. 3, its description will be omitted.

In the Metro-style, the XPS print system 29 works, but the GDI print system 28 does not work.

Additionally, the GDI printer driver 25 may be used in the Metro-style. However, the conversion from the XPS file to the EMF file is performed, so that the print quality is decreased.

(4) Installation of Printer Driver

When the printer is connected to the USB host interface 16, the OS 21 automatically downloads the printer driver for controlling the printer by a plug and play (PnP) function, and then installs it in the PC 1.

In this case, when a provider of the printer driver provides both the GDI printer driver 25 and the XPS printer driver 26 for the same model printer, it may be set whether any of both drivers is given priority in download. At present, since the Win32 application is mainly used, the GDI printer driver 25 is set to have a priority.

When the GDI printer driver 25 is set to have a priority, the GDI printer driver is installed when the style at present is the Metro-style.

In addition, the user may install the printer driver by manual operation. In this instance, the user may install the XPS printer driver 26 by selecting the XPS printer driver 26.

The installed printer driver is shared with the Desktop-style and the Metro-style. For this reason, for example, when the GDI printer driver 25 is installed in the Desktop-style, the GDI printer driver 25 is used in the Metro-style.

(5) Process of Prompting Installation of XPS Printer Driver

Since the Win32 application 22 is not executed in the Metro-style, it is preferable to use the XPS printer driver 26 so as to reduce the deterioration of the print quality when the number of printing in the Metro-style is larger than the number of printing in the Desktop-style.

On the other hand, it is preferable to use the GDI printer driver 25 so as to reduce the deterioration of the print quality when the number of printing using the Win32 application 22 in the Metro-style is larger than the number of printing in the Desktop-style. Further, since the GDI printer driver 25 has many functions than the XPS printer driver 26, the GDI printer driver 25 is preferable in this view of the user who frequently uses the Win32 application 22.

Accordingly, it may be not preferable to install the XPS printer driver 26. However, some of users who frequently print in Metro-style may use the installed GDI printer driver 25 without knowing that the print quality is deteriorated than the XPS printer driver 26 when the GDI printer driver 25 is used.

Therefore, the PC 1 according to the first illustrative embodiment prompts a user to install the XPS printer driver 26 when the GDI printer driver 25 is installed when it is being switched in the Metro-style, in order to reduce a case that user who prints in the Metro-style rather than the Desktop-style uses the GDI printer driver 25.

Figure 5:
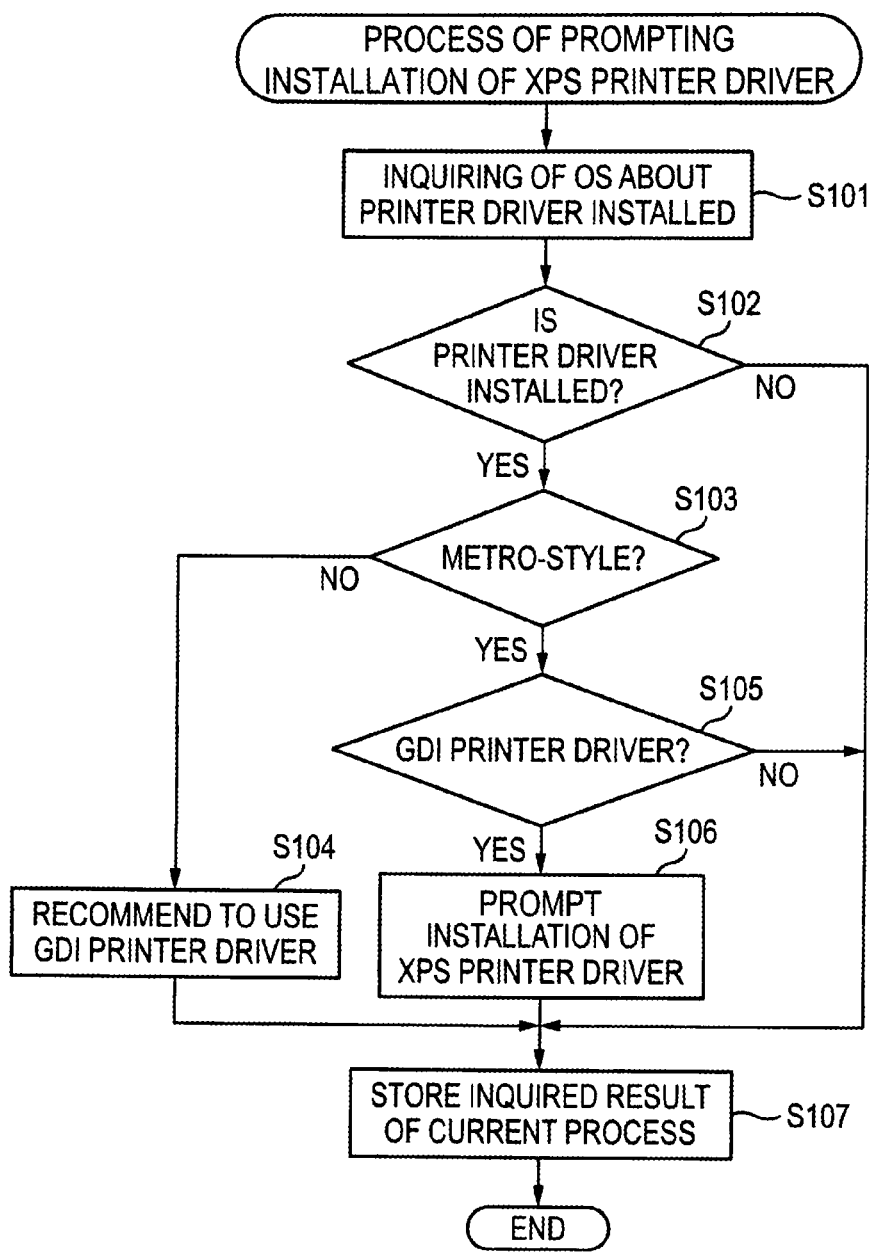
FIG. 5 is a flowchart illustrating the flow of a prompt to install an XPS printer driver.

The process of prompting installation of the XPS printer driver 26 will be described with reference to FIG. 5.

The process is executed by executing the driver managing program 27 illustrated in FIG. 1. The driver managing program 27 according to the first illustrative embodiment is an application for the Desktop-style (Win32 application 22 or WPF application 23). The driver managing program 27 is started as a resident program when the OS 21 starts, and the process is repeated at predetermined time intervals, such as intervals for one minute, irrespective of the current style.

In step S101, the CPU 11a (hereinafter, referred to as a driver managing program 27) for executing the driver managing program 27 inquires of the OS 21 about the printer driver installed in the PC 1.

In step S102, the driver managing program 27 judges whether a new printer driver is installed after the previous process is executed. Step S102 is one example of a process of judging the installation.

Specifically, for example, the driver managing program 27 compares the inquiry result in step S101 and the previous inquiry result that stored in the memory 14 in step S107, which will be described later, when the previous process is executed. When a printer driver is not included in the inquire result of the previous process, but is included in the current inquire result, the driver managing program 27 judges that a new printer drive is installed.

When the new printer driver is installed, the driver managing program 27 proceeds to step S103. When now new printer driver is installed, it proceeds to step S107.

In step S103, the driver managing program 27 judges whether the current style is the Metro-style or not. This judgment can be implemented by various methods.

For example, when the OS 21 includes an API for returning the information displaying the current style to the application, it may be judged by inquiring of the OS 21 about the current style using the API.

When the OS 21 does not include an API, it may be judged by executing the application for the Metro-style. Specifically, for example, an application, which stores the information to indicate the Desktop-style when the withdrawal process is executed, and stores the information to indicate the Metro-style when the return process is executed, may be executed as the application for the Metro-style. In this way, the driver managing program 27 can judge the current style by referring to the information. In this case, it is necessary to execute the application as a resident program in the Metro-style.

The driver managing program 27 proceeds to step S104, when the current style is not the Metro-style, that is, when the current style is the Desktop-style, and proceeds to step S105 when the current style is the Metro-style.

In step S104, the driver managing program 27 displays a message recommending the use of the GDI printer driver 25 on the display unit 12.

The reason why the use of the GDI printer driver 25 is recommended is that the user will frequently prints by using the Win32 application 22 in the Desktop-style in view of that the current style is being in the Desktop-style.

However, there is a possibility that user who frequently prints in the Metro-style temporarily uses the Desktop-style. In this case, it may be not preferable to recommend the use of the GDI printer driver 25. Therefore, it does not necessarily carry out step S104.

In step S105, the driver managing program 27 acquires information about the printer driver including a type of the installed printer driver from the OS 21. The driver managing program 27 judges whether the installed printer driver is the GDI printer driver 25, based on the acquired information. Step S105 is one example of a process of judging the type of the driver.

When the installed printer driver is the GDI printer driver 25, the driver managing program 27 proceeds to step S106, and when the installed printer driver is the step SPS printer driver, it proceeds to step S107.

In step S106, the driver managing program 27 displays the message on the display unit 12 to prompt the user to install the XPS printer driver 26. Step S106 is one example of a process of controlling the information processing to manage the first-type device driver program.

Figure 6:
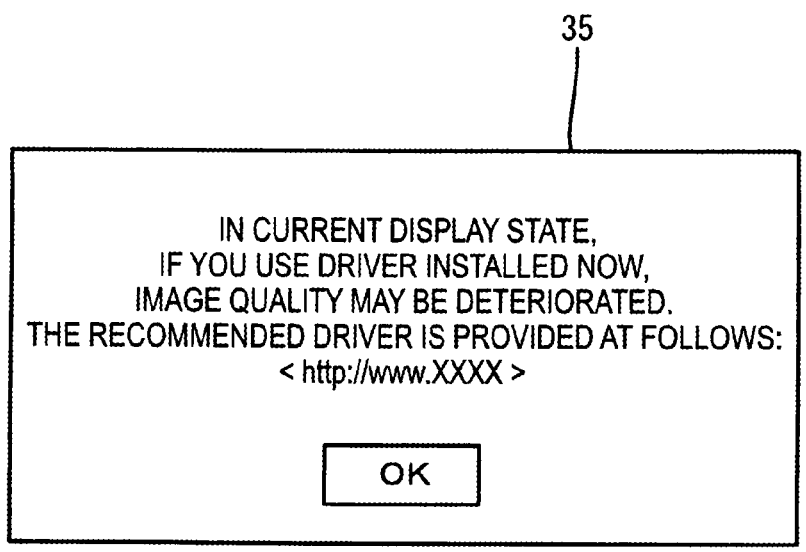
FIG. 6 is a diagram illustrating one example of a message of a prompt to install the XPS printer driver.

FIG. 6 illustrates one example of the above-described message. The message 35 illustrated in FIG. 6 guides the user about a possibility that the image quality may be deteriorated when the installed printer driver is used and an URL of a website from which a recommended printer driver can be downloaded.

The recommended printer driver is the XPS printer driver 26 for controlling the same model printer, which is controlled by the installed GDI printer driver 25.

Incidentally, when it is being switched in the Metro-style, it is not possible that the driver managing program 27, which is the application for the Desktop-style, displays a message on the display unit 12. For this reason, the driver managing program 27 displays the message indirectly.

For example, in the case where the OS 21 includes the API receiving the request to display the message from the application, the driver managing program 27 may request the OS 21 to display the message using the API.

Further, for example, the driver managing program 27 may store the message in the file, and enable the application for the Metro-style to display the message stored in the file. However, it is necessary to start the application as a resident program in the Metro-style.

In step S107, the driver managing program 27 stores the result inquired of the OS 21 in step S101 in the memory 14.

(6) Effect of Illustrative Embodiment

According to the above-described driver managing program 27, in the case where the GDI printer driver 25 is installed when it is being switched in the Metro-style, it prompts the user for installation of the XPS printer driver 26.

Thus, according to the driver managing program 27, it is possible to suppress the print quality from being deteriorated due to the use of the GDI printer driver 25.

Furthermore, according to the driver managing program 27, since the installation of the XPS printer driver 26 is only prompted to the user, the user can select whether to install the XPS printer driver 26.

Accordingly, user who frequently prints by using the Win32 application may not install the XPS printer driver 26 even though the installation of the XPS printer driver 26 is prompted. Additionally, the message in step S106 may be displayed together with another message that the installation of the XPS printer driver 26 may be not recommended to the user who frequently prints by using the Win32 application.

Further, according to the driver managing program 27, when the new printer driver is installed, the type of the printer driver is judged. Therefore, the installation of the XPS printer driver 26 may be prompted when the GDI printer driver 25 is installed.

Further, according to the driver managing program 27, when it is being switched in the Desktop-style, if a new printer driver is installed, the type of the printer driver may be not judged. When it is being switched in the Metro-style, if a new printer driver is installed, the type of the printer driver may be judged.

For example, when it is being switched in the Desktop-style, the type of the printer driver may be judged. However, the using of the Desktop-style indicates a possibility that the user does not use the Metro-style usually. When the Metro-style is not used, it is not desirable to install the XPS printer driver 26.

On the other hand, the using of the Metro-style indicates that the user is using the Metro-style, and the user may use the installed GDI printer driver 25 without knowing that the print quality is deteriorated.

According to the driver managing program 27, if the user may not use the Metro-style, it does not prompt the installation of the XPS printer driver 26, and also it is possible to suppress the deterioration of the print quality due to that the user uses the GDI printer driver 25 without knowing that the print quality is deteriorated in the Metro-style.

Illustrative Embodiment 2

Next, the second illustrative embodiment will be described with reference to FIG. 7.

The first illustrative embodiment has been described with reference to the case where the driver managing program 27 is the application for the Desktop-style. On the other hand, the driver managing program 27 according to the second illustrative embodiment is the application for the Metro-style.

Figure 7:
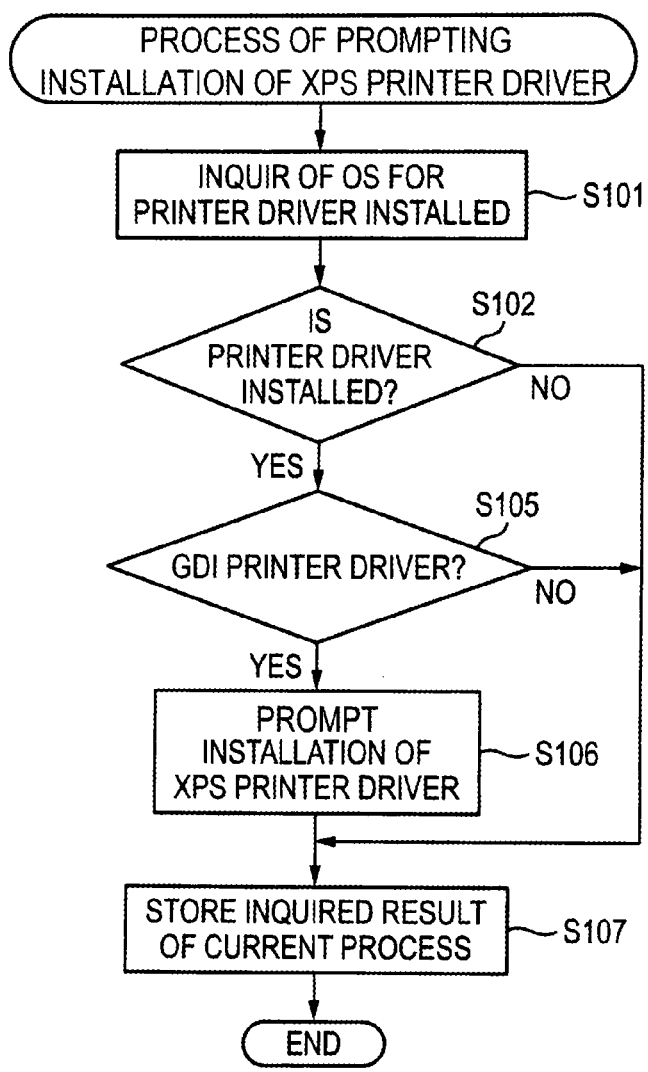
FIG. 7 is a flowchart illustrating the flow of a prompt to install an XPS printer driver according to the second illustrative embodiment.

With reference to FIG. 7, the process of prompting the installation of the XPS printer driver 26 according to the second illustrative embodiment will be described. The process is repeatedly performed at predetermined time intervals, such as one minute intervals, while it is being in the Metro-style.

The process according to the second illustrative embodiment is substantially equal to the process according to the first illustrative embodiment, except for that step S103 and step S104 of the first illustrative embodiment are not executed. Therefore, the same processes as the first illustrative embodiment are denoted by the same reference numeral, and the description thereof will be omitted.

The reason why step S103 and step S104 are not performed is that the process is executed only when it is in the Metro-style. In this embodiment, the current style is the Metro-style without such judgment.

Additionally, the driver managing program 27 according to the second illustrative embodiment is executed as the WPF application 24 for the Metro-style, so that the driver managing program 27 can display the message on the display unit 12 directly in step S106.

According to the above-described driver managing program 27 of the second illustrative embodiment, it is possible to suppress the deterioration in print quality due to the use of the GDI printer driver 25.

Illustrative Embodiment 3

Figure 8:
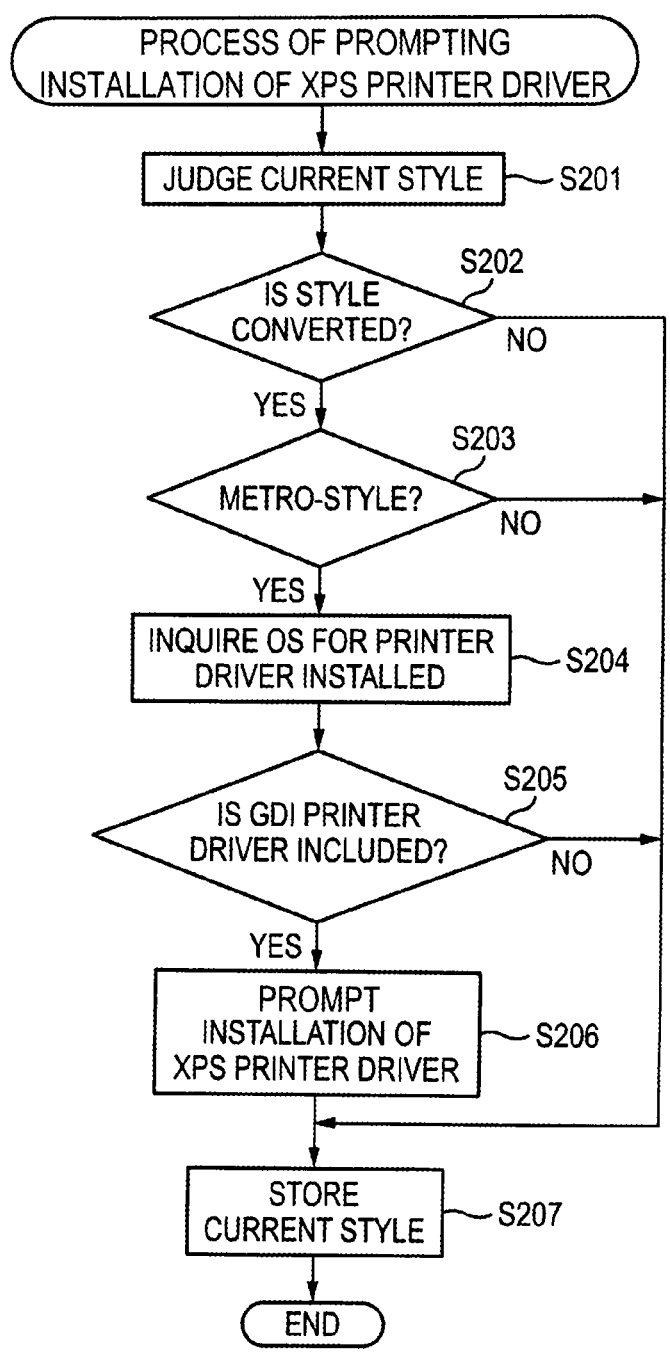
FIG. 8 is a flowchart illustrating the flow of a prompt to install an XPS printer driver according to the third illustrative embodiment.

Next, the third illustrative embodiment will be described with reference to FIG. 8.

The driver managing program 27 according to the third illustrative embodiment is the application for the Desktop-style, similar to the first illustrative embodiment.

In the first illustrative embodiment, it is judged whether the printer driver is installed in the PC 1, and when the printer driver is installed, it is judged whether the installed printer driver is the GDI printer driver 25.

In contrast, the driver managing program 27 according to the third illustrative embodiment does not judge whether the printer driver is installed or not. Instead, the driver managing program 27 according to the third illustrative embodiment judges whether the GDI printer driver 25 is installed, when it is switched into the Metro-style, and when the GDI printer driver 25 is installed, it is prompted to install the XPS printer driver 26.

The process of prompting the installation of the XPS printer driver 26 according to the third illustrative embodiment will be described with reference to FIG. 8. The process is repeatedly performed at predetermined time intervals, such as one minute intervals, irrespective of the Desktop-style or the Metro-style.

In step S201, the driver managing program 27 judges the current style. This judgment can be performed similarly to step S103.

In step S202, the driver managing program 27 judges whether the style was switched.

Specifically, for example, the driver managing program 27 compares the judged result in step S201 and the judged result which stored in the memory 14 in step S207 when the previous process is executed. When the judged result of the previous process is different from the judged result of the current process, it is judged that the style is changed.

The driver managing program 27 proceeds to step S203 when the style is switched or proceeds to 207 when the style is not switched.

In step S203, the driver managing program 27 judges whether the current style judged in step S201 is the Metro-style. When it is the Metro-style, it proceeds to step S204, and when it is the Desktop-style, it proceeds to step S207.

The above-described step S201 to step S203 are one example of a process of judging the switching.

In step S204, the driver managing program 27 inquires of the OS 21 for the printer driver installed in PC 1.

In step S205, the driver managing program 27 judges whether even one GDI printer driver 25 is included in the printer drivers installed in the PC 1. When even one GDI printer driver 25 is included, it proceeds to step S206, and when no GDI printer driver 25 is included, it proceeds to step S207.

Instead of the judgment in step S205, for example, it may be judged whether the printer driver corresponding to the printer set in the PC 1 as a default printer at present is the GDI printer driver. Since the default printer is controlled by the OS 21, the driver managing program 27 can judge whether the printer driver corresponding to the printer set as the default printer by inquiring of the OS 21.

In this case, when the printer driver corresponding to the printer set in the PC 1 as a default printer is the GDI printer driver 25, the driver managing program 27 proceeds to step S206, and when it is not the GDI printer driver 25, it proceeds to step S207.

Instead of step S205 described above, for example, it may be judged whether the printer driver capable of controlling a printer connected to the PC 1 is only the GDI printer.

Specifically, the driver managing program 27 acquires the information about the printer connected to the PC 1 by broadcasting the printer connected via the LAN or acquiring information from the printer connected via the USB.

Based on the information about the printer and the information about the printer driver installed in the PC 1, it is judged whether the controllable printer driver is only the GDI printer driver 25. When the controllable printer driver is only the GDI printer driver 25, the driver managing program proceeds to step S206, and when he controllable printer driver is not only the GDI printer driver 25, it proceeds to step S207.

In step S206, the driver managing program 27 displays the message on the display unit 12 to prompt the user for the installation of the XPS printer driver 26.

In step S207, the driver managing program 27 stores the current style judged in step S201 in the memory 14.

According to the above-described driver managing program 27 according to the third illustrative embodiment, when the Desktop-style is switched into the Metro-style, it is judged whether the GDI printer driver 25 is installed.

For example, there is a case where the GDI printer driver 25 is installed before the driver managing program 27 is installed. In this case, if it is judged whether the printer driver is the GDI printer driver 25 or not when the printer drive is installed, the GDI printer driver 25 installed earlier than the driver managing program 27 is not subjected to the judgment.

According to the driver managing program 27 of the third illustrative embodiment, when the Desktop-style is switched into the Metro-style, it is judged whether the GDI printer driver 25 is installed. Therefore, it is judged whether the printer drive installed earlier than the driver managing program 27 is the GDI printer driver 25.

Illustrative Embodiment 4

Figure 9:
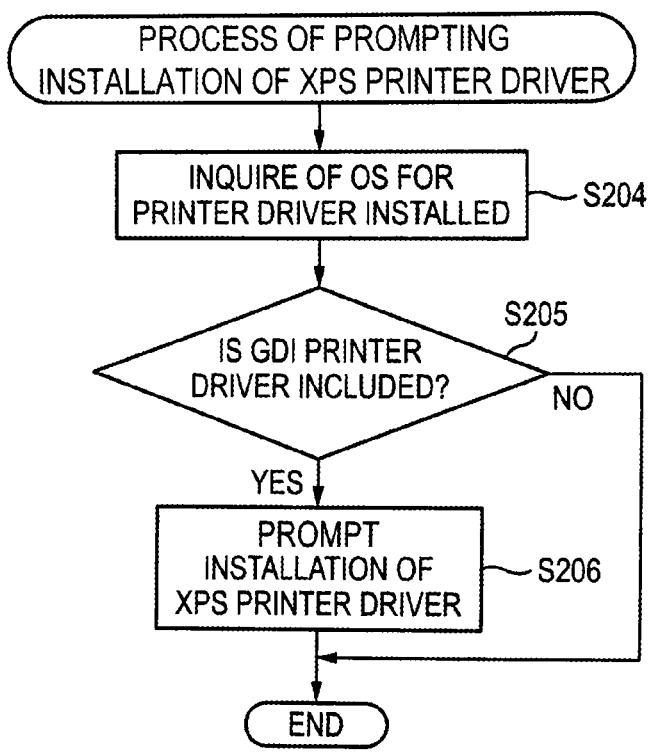
FIG. 9 is a flowchart illustrating the flow of a prompt to install an XPS printer driver according to the fourth illustrative embodiment.

Next, the fourth illustrative embodiment will be described with reference to FIG. 9

The driver managing program 27 according to the fourth illustrative embodiment is the application for the Metro-style, similar to the second illustrative embodiment.

However, the driver managing program 27 according to the fourth illustrative embodiment does not judge whether the printer drive is installed or not, similar to the third illustrative embodiment. Instead, the driver managing program 27 according to the fourth illustrative embodiment periodically judges whether the GDI printer driver 25 is installed while it is being in the Metro-style. When the GDI printer driver 25 is installed, the installation of the XPS printer driver 26 is prompted.

The process of prompting the installation of the XPS printer driver 25 according to the fourth illustrative embodiment will be described with reference to FIG. 9. The process is repeatedly performed at predetermined time intervals, such as one minute intervals, while it is being in the Metro-style.

The process of the fourth illustrative embodiment is substantially equal to the process of the third illustrative embodiment, except for that step S201 to step S203, and step S207 of the third illustrative embodiment are not performed. The processes substantially equal to the third illustrative embodiment are denoted by the same reference numeral, and its description will be omitted.

In the above-described driver managing program 27 according to the fourth illustrative embodiment, it can be judged whether the printer driver installed earlier than the driver managing program 27 is the GDI printer driver 25.

In the driver managing program 27 according to the fourth illustrative embodiment, it is periodically judged whether the GDI printer driver 25 is installed, not when the Desktop-style is switched into the Metro-style, but while it is being in the Metro-style. Accordingly, in the case where the printer driver is installed while it is being in the Metro-style, it can be judged whether the GDI printer driver 25 is installed without waiting for the switching of the Metro-style after it is switched into the Desktop-style.

Illustrative Embodiment 5

Figure 10:
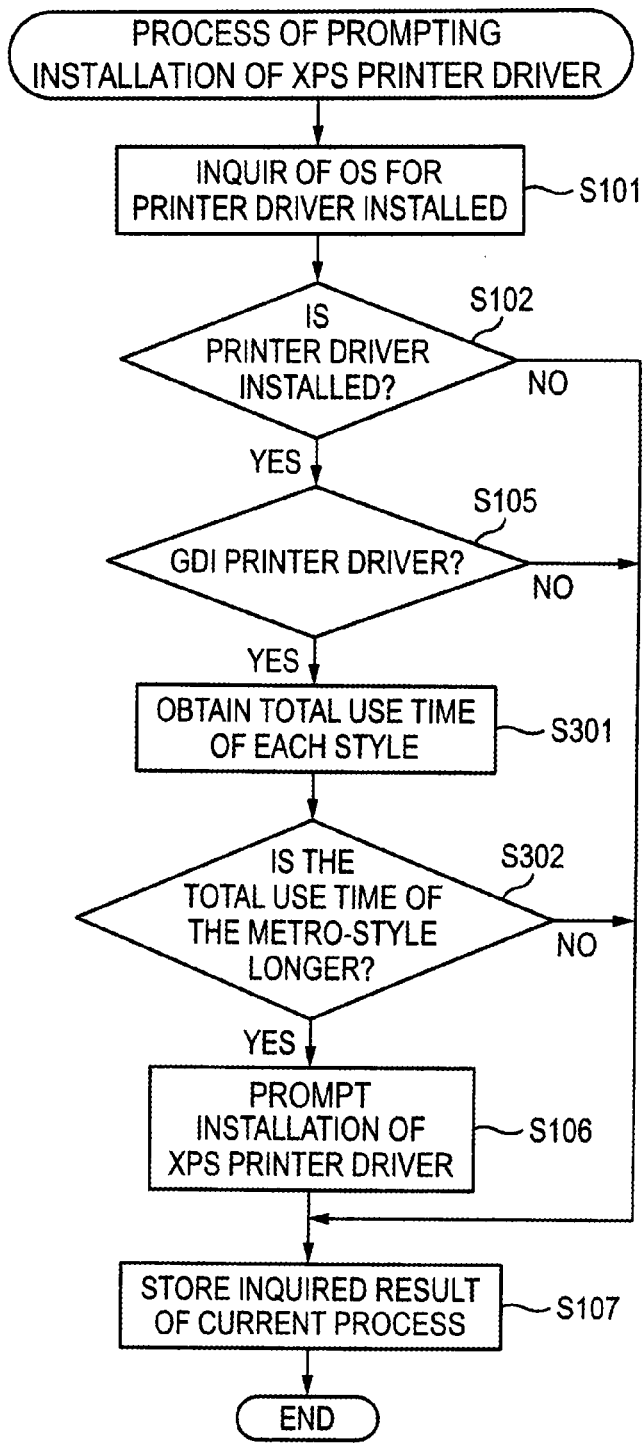
FIG. 10 is a flowchart illustrating the flow of a prompt to install an XPS printer driver according to the fifth illustrative embodiment.

Next, the fifth illustrative embodiment will be described with reference to FIG. 10.

In the first to fourth illustrative embodiments described above, the case of prompting the installation of the XPS printer driver 26 has been described, in the case where the GDI printer driver 25 is installed when it is being switched in the Metro-style.

However, there is, for example, there is a case where the user who frequently prints by using the Win32 application 22 in the Desktop-style use the Metro-style temporarily. In this case, it may be not preferable to prompt the installation of the XPS printer driver 26 even when it is being switched in the Metro-style. The reason is that the printing by using GDI printer driver 25 is preferable for the user who frequently prints by using the Win32 application 22.

Accordingly, in the fifth illustrative embodiment, a switching history of the style is referenced, and then in the case where the style used most in the past is the Metro-style, the installation of the XPS printer driver 26 is prompted. In contrast, in the case where the style used most in the past is the Desktop-style, the installation of the XPS printer driver 26 is not prompted.

Here, the driver managing program 27 is the application for the Metro-style similar to the second illustrative embodiment, and it will be described the case where it is judged whether the installation of the XPS printer driver 26 is prompted or not when the printer driver is installed, as one example.

(1) Storing the Switching History of Style

The storing of the switching history of the style may be performed by executing a switching history storing application for storing a switching time of the style in a history file, as a resident program.

Whether to execute the switching history storing application as the application for the Desktop-style or the application for the Metro-style depends on whether the OS 21 includes the API for returning the information to indicate the current style to the application.

When the OS 21 includes the API for returning the information to indicate the current style to the application, the switching history storing application may be executed as the application for the Desktop-style.

Additionally, the switching history storing application inquires of the OS 21 for the current style periodically. When the style inquired at the pervious process is different from the style inquired at the current process, it is judges that the style is switched, and thus the time at that time is stored in the history file.

On the other hand, when the OS 21 does not include the API for returning the information to indicate the current style to the application, the history may be stored by executing the switching history storing application as the application for the Metro-style. Specifically, for example, application may be executed as the application for the Metro-style, and in the withdrawal process, the time at that time is stored in the history file as the time when the Metro-style is switched into the Desktop-style, and in the return process, the time at that time is stored in the history file as the time when the Desktop-style is switched into the Metro-style. However, the application should be executed as a resident program in the Metro-style.

Incidentally, operation of turning off a power supply of the PC 1 may be performed. When the operation of turning off the power source is performed, the times before the power source is turned off and when the power source is turned on are stored in the history file. In this case, for example, the sum of the time from when it is switched into the Desktop-style to when the power source is turned off and the time from when the power source is turned on to when it is switched into the Metro-style becomes the time being switched in the Desktop-style.

In the case of the second illustrative embodiment and the fourth illustrative embodiment, since the driver managing program 27 is executed as the application for the Metro-style, the driver managing program 27 may also serve as the switching history storing application.

(2) Process of Driver Control Program

Next, the process of the driver managing program 27 according to the fifth illustrative embodiment will be described with reference to FIG. 10. In the process of the driver managing program 27 according to the fifth illustrative embodiment, step S301 and step S302 are performed, in addition to the process of the second illustrative embodiment. The same processes as the second illustrative embodiment are denoted by the same reference numeral, and its description will be omitted.

In step S301, the driver managing program 27 obtains the total use times of each style by going back for a predetermined time from the current time with reference to the history file.

Incidentally, a utilization rate may be obtained by dividing the total use times by the predetermined time. Further, instead of the total use time or the utilization rate within the predetermined time, a total use time or a utilization rate may be obtained from the time when the store is started in the history file.

In step S302, the driver managing program 27 judges whether the total use time of the Metro-style is longer than the total use time of the Desktop-style. When the total use time of the Metro-style is longer than the total use time of the Desktop-style, the driver managing program 27 proceeds to step S106, and when the total use time of the Desktop-style is longer than the total use time of the Metro-style, it proceeds to step S107. Step S302 is one example of a process of judging the styles.

(3) Effect of Illustrative Embodiment

According to the above-described driver managing program 27 of the fifth illustrative embodiment, when the most-used style is not the Metro-style, the installation of the XPS printer driver 26 may not be prompted.

Other Illustrative Embodiments

This disclosure is not limited to the illustrative embodiments described in the above description and the drawings. For example, the following illustrative embodiments are included in the technical scope of this disclosure.

(1) In the above illustrative embodiment, the OS 21 capable of switching the styles has been described as one example. However, it is not limited to the OS 21 capable of switching the styles. For example, only the Metro-style is operated, or an only style corresponding to the Metro-style is operated.

(2) In the above illustrative embodiment, a case of prompting the installation of the XPS printer driver 26 when the GDI printer driver 25 is installed has been described as one example.

On the other hand, the installed GDI printer driver 25 may be uninstalled. Specifically, for example, only the Metro-style is operated, or it is judged that the total use time of the Metro-style is long in the fifth illustrative embodiment, the installed GDI printer driver 25 may be uninstalled. Accordingly, it is prompted the user for the installation of the XPS printer driver 26.

Similarly, the XPS printer driver 26 capable of controlling the same model printer, which is controlled by the installed GDI printer driver 25 may be installed. Accordingly, it is possible to reduce trouble that the user installs the XPS printer driver 26.

(3) The driver managing program 27 may execute both the process of the driver managing program 27 according to the first illustrative embodiment and the process of the driver managing program 27 according to the third illustrative embodiment. Specifically, when is judged in step S102 of FIG. 5 that the new printer driver is not installed, it may proceed to step S201 of FIG. 8.

Similarly, the driver managing program 27 may execute both the process of the driver managing program 27 according to the second illustrative embodiment and the process of the driver managing program 27 according to the fourth illustrative embodiment.

(4) In the above illustrative embodiment, the case of prompting the installation of the XPS printer driver 26 when the GDI printer driver 25 is installed has been described as one example. On the other hand, the driver managing program 27 may judge whether the XPS printer driver 26 controlling the same model printer, which is controlled by the GDI printer driver 25, is provided by printer makers. The driver managing program 27 may not prompt the installation of the XPS printer driver 26 when the XPS printer driver 26 is not provided.

(5) In the above fifth illustrative embodiment, it is described the case where whether to prompt the installation of the XPS printer driver 26 is judged based on the total use time of each style, as one example.

On the other hand, it may be judged based on the number of times that the printing is instructed from the Win32 application 22 and the number of times that the printing is instructed from the WPF applications 23 and 24. When the number of times that the printing is instructed from the Win32 application 22 is larger than the other, it is preferable to install the GDI printer driver. When the number of times that the printing is instructed from the WPF applications 23 and 24 is larger than the other, it is preferable to install the XPS printer driver 26.

(6) In the third illustrative embodiment, it has been described the case where it is judged whether the GDI printer driver 25 is installed, when the Desktop-style is being switched in the Metro-style, as one example. On the other hand, similar to the fourth illustrative embodiment, while it is being in the Metro-style, it may be periodically judged whether the GDI printer driver 25 is installed. That is, the process of step S202 may be skipped.

(7) In the above illustrative embodiment, the device driver program has been described as the printer driver. On the other hand, the device driver program may be a facsimile (FAX) driver.

(8) In the above illustrative embodiment, the information processing device has been described as a tablet-shaped computer. On the other hand, the information processing device may be a computer of a desktop type or a notebook type, or a cell-phone.

What is claimed is:

1. A non-transitory computer-readable medium storing instructions to control an information processing device, in which an operating system is executed, wherein the operating system outputs process data to a device driver program, in which, when the device driver program being an output destination of the process data is a first-type device driver program interpreting a first-format process data, the first-format process data is output, and in which, when the device driver program being an output destination of the process data is a second-type device driver program interpreting a second-format process data different from the first-format process data, the first-format process data is converted into the second-format process data to output the second-format process data, and wherein
   the instructions, when executed by a processor, cause the information processing device to perform:
   inquiring of the operating system about the device driver program installed in the information processing device;
   receiving an inquiry result from the operating system;
   judging whether the device driver program installed in the information processing device is the second-type device driver program based on the inquiry result; and
   performing, when it is judged that the device driver program is the second-type device driver program, a process for installing the first-type device driver program,
   wherein the operating system is configured to switch a plurality of operation styles, the plurality of operation styles including a first operation style and a second operation style;
   wherein, in the first operation style, a first-type application program, which outputs a first-type data process command, is operated,
   wherein, in the second operation style, both the first-type application program, which outputs the first-type data process command and a second-type application program, which outputs a second-type data process command, are operated,
   wherein, in the first operation style, the first-type data process command is received from the first-type application program, the first-format process data is output when the device driver program being the output designation of the process data is the first-type device driver program, and the first-format process data is converted into the second-format process data and then the converted process data is output when the device driver program is the second-type device driver program,
   wherein, in the first operation style, the second-type data process command which is different from the first-type data process command is not received,
   wherein, in the second operation style, the first-type data process command is received from the first-type application program, the first-format process data is output when the device driver program being the output designation of the process data is the first-type device driver program, and the first-format process data is converted into the second-format process data and then the converted process data is output when the device driver program is the second-type device driver program,
   wherein, in the second operation style, the second-type data process command is received from the second-type application program, the second-format process data is output when the device driver program being the output designation of the process data is the second-type device driver program, and the second-format process data is converted into the first-format process data and then the converted process data is output when the device driver program is the first-type device driver program, and
   wherein the instructions, when executed by the processor, further cause the information processing device to perform:
   executing the judging whether the device driver program installed in the information processing device is the second-type device driver program, when the operating system is in the first operation style.

2. The non-transitory computer-readable medium according to claim 1, wherein the instructions, when executed by the processor, further cause the information processing device to perform:
   uninstalling the second-type device driver program.

3. The non-transitory computer-readable medium according to claim 1, wherein the instructions, when executed by the processor, further cause the information processing device to perform:
   displaying a screen for recommending installation of the first-type device driver program.

4. The non-transitory computer-readable medium according to claim 1, wherein the instructions, when executed by the processor, further cause the information processing device to perform:
   installing the first-type device driver program, which controls a device of the same model as the device controlled by the second-type device driver program.

5. The non-transitory computer-readable medium according to claim 1, wherein the instructions, when executed by the processor, further cause the information processing device to perform:
  judging whether a new device driver program is installed in the information processing device; and
  executing the judging whether the device driver program installed in the information processing device is the second-type device driver program, when it is judged that the new device driver program is installed.

6. The non-transitory computer-readable medium according to claim 1, wherein the instructions, when executed by the processor, further cause the information processing device to perform:
  judging which is a most frequently used operation style in the past, with reference to a switching history of the operation style, and
  installing the first-type device driver program, when it is judged that the device driver program is the second-type device driver program and that the most frequently used operation style is the first operation style.

7. The driver managing program according to claim 1, wherein the instructions, when executed by the processor, further cause the information processing device to perform:
  judging whether another operation style different from the first operation style is switched in the first operation style, and
  executing the judging whether the device driver program installed in the information processing device is the second-type device driver program when it is judged that it is being switched in the first operation style.

8. An information processing device comprising:
  memory storing an operating system, a first-type application program and a second-type application program, wherein the operating system is configured to switch a plurality of operation styles, the plurality of operation styles including a first operation style and a second operation style, wherein, in the first operation style, the first-type application program, which outputs a first-type data process command, is operated, wherein, in the second operation style, both the first-type application program, which outputs the first-type data process command and the second-type application program, which outputs a second-type data process command, are operated,
  wherein the operating system outputs process data to a device driver program, in which, when the device driver program being an output destination of the process data is a first-type device driver program interpreting a first-format process data, the first-format process data is output, and in which, when the device driver program being an output destination of the process data is a second-type device driver program interpreting a second-format process data which is different from the first-format process data, the first-format process data is converted into the second-format process data to output the second-format process data, and
  a processor configured to execute:
  inquiring of the operating system about the device driver program installed in the information processing device;
  receiving an inquiry result from the operating system;
  judging whether the device driver program installed in the information processing device is the second-type device driver program based on the inquiry result; and
  performing a process for installing the first-type device driver program when it is judged that the device driver program is the second-type device driver program,
  wherein, in the first operation style, the first-type data process command is received from the first-type application program, the first-format process data is output when the device driver program being the output designation of the process data is the first-type device driver program, and the first-format process data is converted into the second-format process data and then the converted process data is output when the device driver program is the second-type device driver program,
  wherein, in the first operation style, the second-type data process command which is different from the first-type data process command is not received,
  wherein, in the second operation style, the first-type data process command is received from the first-type application program, the first-format process data is output when the device driver program being the output designation of the process data is the first-type device driver program, and the first-format process data is converted into the second-format process data and then the converted process data is output when the device driver program is the second-type device driver program,
  wherein, in the second operation style, the second-type data process command is received from the second-type application program, the second-format process data is output when the device driver program being the output designation of the process data is the second-type device driver program, and the second-format process data is converted into the first-format process data and then the converted process data is output when the device driver program is the first-type device driver program, and
  wherein the processor is further configured to judge whether the device driver program installed in the information processing device is the second-type device driver program, when the operating system is in the first operation style.

9. A non-transitory computer-readable medium storing instructions to control an information processing device, in which an operating system is executed, wherein the operating system outputs process data to a device driver program, in which, when the device driver program being an output destination of the process data is a first-type device driver program interpreting a first-format process data, the first-format process data is output, and in which, when the device driver program being an output destination of the process data is a second-type device driver program interpreting a second-format process data different from the first-format process data, the first-format process data is converted into the second-format process data to output the second-format process data, and wherein
  the instructions, when executed by a processor, cause the information processing device to perform:
  inquiring of the operating system about the device driver program installed in the information processing device;
  receiving an inquiry result from the operating system;
  judging whether the first-type device driver program is installed based on the inquiry result; and
  performing, when it is judged that the first-type device driver program is not installed, a process for installing the first-type device driver program,
  wherein the operating system is configured to switch a plurality of operation styles, the plurality of operation styles including a first operation style and a second operation style;
  wherein, in the first operation style, a first-type application program, which outputs a first-type data process command, is operated, wherein, in the second operation style, both the first-type application program, which outputs the first-type data process command and a second-type application program, which outputs a second-type data process command, are operated, wherein, in the first operation style, the first-type data process command is received from the first-type application program, the first-format process data is output when the device driver program being the output designation of the process data is the first-type device driver program, and the first-format process data is converted into the second-format process data and then the converted process data is output when the device driver program is the second-type device driver program, wherein, in the first operation style, the second-type data process command which is different from the first-type data process command is not received, wherein, in the second operation style, the first-type data process command is received from the first-type application program, the first-format process data is output when the device driver program being the output designation of the process data is the first-type device driver program, and the first-format process data is converted into the second-format process data and then the converted process data is output when the device driver program is the second-type device driver program, wherein, in the second operation style, the second-type data process command is received from the second-type application program, the second-format process data is output when the device driver program being the output designation of the process data is the second-type device driver program, and the second-format process data is converted into the first-format process data and then the converted process data is output when the device driver program is the first-type device driver program, and wherein the instructions, when executed by the processor, further cause the information processing device to perform:

executing the judging whether the device driver program installed in the information processing device is the first-type device driver program, when the operating system is in the first operation style.

\* \* \* \* \*